US011038712B2

(12) United States Patent
Schlautmann et al.

(10) Patent No.: US 11,038,712 B2
(45) Date of Patent: Jun. 15, 2021

(54) BUS NODE ADDRESS VERIFICATION

(71) Applicant: Elmos Semiconductor SE, Dortmund (DE)

(72) Inventors: Guido Schlautmann, Altenberge (DE); André Schmidt, Wiehl (DE); Stefanie Heppekausen, Essen (DE); Jürgen Naumann, Dortmund (DE)

(73) Assignee: ELMOS Semiconductor AG, Dortmund (DE)

( * ) Notice: Subject to any disclaimer, the term of this patent is extended or adjusted under 35 U.S.C. 154(b) by 0 days.

(21) Appl. No.: 16/784,419

(22) Filed: Feb. 7, 2020

(65) Prior Publication Data
US 2020/0274730 A1 Aug. 27, 2020

(30) Foreign Application Priority Data

Feb. 27, 2019 (DE) .................... 10 2019 104 918.0
May 29, 2019 (EP) ..................... 19177391

(51) Int. Cl.
*H04L 12/40* (2006.01)
*H04L 29/12* (2006.01)

(52) U.S. Cl.
CPC .. *H04L 12/40032* (2013.01); *H04L 12/40019* (2013.01); *H04L 61/2038* (2013.01)

(58) Field of Classification Search
CPC ......... H04L 12/40032; H04L 12/40019; H04L 61/2038
See application file for complete search history.

(56) References Cited

U.S. PATENT DOCUMENTS

| 2019/0095379 A1 | 3/2019 | Schmitz |
| 2019/0166089 A1 | 5/2019 | Schmitz |
| 2019/0173838 A1 | 6/2019 | Schmitz |

FOREIGN PATENT DOCUMENTS

| CN | 109 618 013 A | 4/2019 |
| CN | 109 862 128 A | 6/2019 |
| CN | 109 871 345 A | 6/2019 |
| DE | 10 2010 026 431 B4 | 6/2012 |
| DE | 10 2017 122 365 B3 | 7/2018 |
| DE | 10 2017 012 179 A1 | 3/2019 |
| DE | 10 2017 128 489 A1 | 3/2019 |
| DE | 10 2017 128 923 A1 | 3/2019 |
| DE | 10 2018 104 488 A1 | 3/2019 |
| DE | 10 2018 104 489 A1 | 8/2019 |
| DE | 10 2018 124 279 A1 | 1/2020 |
| DE | 10 2018 124 281 A1 | 1/2020 |
| EP | 1490772 B1 | 6/2005 |
| EP | 1603282 B1 | 9/2008 |
| EP | 1676403 B1 | 12/2012 |
| EP | 3 461 068 A1 | 3/2019 |
| EP | 3 461 069 A1 | 3/2019 |
| EP | 3 493 479 A1 | 6/2019 |
| EP | 3 493 481 A1 | 6/2019 |
| EP | 3 496 341 A1 | 6/2019 |
| WO | 2019233776 A1 | 12/2019 |

OTHER PUBLICATIONS

Specification by Elmos Semiconductor AG "RGB LIN Controller with Current Source E521.36" (QM-Nr.: 25DS0160E.02).

*Primary Examiner* — Henry Tsai
*Assistant Examiner* — John B Roche
(74) *Attorney, Agent, or Firm* — Mindful IP PLLC

(57) ABSTRACT

Disclosed is a method for detecting an erroneous bus node address allocation in data bus systems with auto addressing using an addressing current, such as LIN data bus systems with auto addressing. The method comprises performing auto addressing of the n bus nodes, causing an addressing current to be supplied by a bus node, sensing the data bus current by the bus nodes and determining a bus node-specific bus current measurement value, deciding, whether an addressing current flows through the respective bus node, and determining a bus node-specific addressing current presence value, transmitting the bus node-specific bus current measurement value and/or the bus node-specific addressing current presence value from the bus node to the bus master, forming a supply bus node-specific result vector from the received bus node-specific addressing current presence values, and comparing the supply bus node-specific result vector and a supply bus node-specific expectation vector.

13 Claims, No Drawings

BUS NODE ADDRESS VERIFICATION

CROSS-REFERENCE TO RELATED APPLICATIONS

This application claims priority to German Application No. DE 10 2019 104 918.0, filed on Feb. 27, 2019, and to European Application No. EP 19 177 391.0, filed on May 29, 2019, which applications are hereby incorporated herein by reference in their entireties.

The disclosure relates to a method for providing the possibility of verifying the correctness of addresses previously allocated to bus nodes of a serial data bus system. The disclosure further relates to a bus node for such a data bus system and a method for operating such a bus node.

The disclosure relates in particular to a method for detecting an incorrect bus node address allocation in data bus systems with auto addressing using an addressing current.

Auto addressing methods have been known for some time. For a better understanding of the disclosure reference is made to the following documents:

EP 1 490 772 B1, EP 1 603 282 B1, DE 10 2017 122 365 B3, DE 10 2010 026 431 B4, and the specification by Elmos Semiconductor AG "RGB LIN Controller with Current Source E521.36" (QM-Nr.: 25DS0160E.02).

The auto addressing technique described in these documents finds application primarily in the automobile industry for auto addressing bus nodes in a sequential LIN data bus comprising a bus master for controlling these bus nodes. The method presented herein requires the bus nodes to be installed in the data bus so that they form a linear chain along the data bus, wherein the bus master being located at one of the two ends which will hereinafter be referred to as the front end of the bus.

The auto addressing of such linear chains of bus nodes along a data bus is also described, among others, in DE 10 2017 128 489 A1, DE 10 2017 128 923 A1, DE 10 2017 012 179 A1, DE 10 2018 104 488.7, DE 10 2018 104 489.5, as well as in patent applications DE 10 2018 124 279.4, DE 10 2018 124 281.6.

The combination of the technique presented herein and the technical content of all the above-mentioned documents is part of the subject matter of the present disclosure.

It is an essential feature of the auto addressing methodology proposed in these documents that each bus node not yet addressed supplies an auto addressing current towards the bus master in an addressing cycle initiated by the bus master. Here, all bus nodes which are located between the last bus node connected to the bus and supplying an addressing current and the bus master, can detect that they are not the bus node farthest away from the bus master. Following an instruction from the bus master, only that bus node that has no valid bus node address yet and detects no addressing current from a subsequent bus node that is farther from the bus master, accepts the bus node address to be allocated which is offered by the bus master. Here, a valid bus node address is to be understood as an address allocated to the bus node in a correct manner during the address allocation process. It is conceivable to allocate a temporary bus node address to the bus nodes in some other manner prior to the addressing process, e.g. by means of a random number methodology that is not related to the physical position in the data bus. By accepting the bus node address to be allocated which is offered by the bus master, this bus node then instantaneously has a valid bus node address in the sense of the auto addressing method and no longer participates in subsequent addressing cycles until the bus node address becomes invalid, e.g. by order of the bus master. In particular, it no longer supplies any addressing current towards the bus master during the subsequent addressing cycles, whereby the bus node, which is next to the former bus node with respect to the bus master and has not yet been addressed, can detect itself during the next addressing cycle as the last bus node and can accept the further bus node address then offered from the bus master. A "bus node not yet addressed" is meant to be a bus node which has not yet received a valid new bus node address in the course of the addressing process described herein. This process will then be continued until all bus nodes have received a bus node address and the bus is thus addressed completely.

However, it cannot be excluded that errors occur in this addressing process.

In case of a failed address allocation, be it due to double allocation or confusion of a bus node address for whatever reason, it cannot be decided at which physical position a bus node with a wrong bus node address is located. Therefore, the position of the detection is checked at the automobile manufacturer by means of a complex production line end test. These costs shall be avoided.

Presently, an increased trustworthiness of the addressing cycle is achieved by performing a redundant second addressing cycle for verification purposes (Assign ID and Check ID). However, with static errors, which always reproduce themselves for whatever reasons, an erroneous position will always or with high probability be allocated erroneously again. Thus, in prior art, the error can be detected reliably only in case of intermittent errors having a switching rate.

An alternative method for verifying, whether an automatic bus node addressing was performed correctly is described in EP-B-1 676 403.

It is an object of the disclosure to provide a method that is free of the above disadvantages of the prior art and allows to also detect static errors. Moreover, the method and a device operated with the same are intended to have further advantages.

To achieve this object the disclosure proposes a method for providing the possibility of verifying the correctness of addresses allocated to bus nodes of a serial data bus system comprising a data bus, a bus master and a plurality of bus nodes each having an address, wherein the data bus extends from the bus master and the bus nodes are connected to the data bus, and wherein at least some of the bus nodes comprise a current measuring circuit serially connected to the data bus and a current source for supplying current into the data bus which current flows to the bus master, the method comprising the following steps:

providing, for and/or in the bus master, allocation information regarding the allocation of the addresses of the bus nodes to their respective positions in the data bus and expectation information regarding the bus node or bus nodes comprising a current measuring circuit, which is or are expected to detect a current if a respective one of these bus nodes supplies a current into the data bus via its current source, which current flows towards the bus master, initiated by the bus master, causing a current to be supplied by one of the bus nodes comprising a current measuring circuit and a current source, detecting by all bus nodes comprising a current measuring circuit and a current source, whether these bus nodes each sense a current or not, transmitting the detection results to the bus master by said bus nodes, and comparing, in particular in the bus master, the detection results and the respective expectations information.

It is suitable if, within the framework of the disclosure, to proceed such that
for each bus node comprising a current measuring circuit and a current source, the steps of
causing the supply of a current by said bus node into the data bus,
detecting whether each of these bus nodes sense a current or not, the detection being performed by all of the bus nodes comprising a current measuring circuit and a current source, and
transmitting the detection results by said bus nodes to the bus master
is performed and
the comparison of the detection results and the respective expectation information is carried out in the bus master in order to assess whether the bus nodes are correctly addressed corresponding to their respective positions in the data bus.

If necessary, the following additional steps may be provided:
acknowledging the correctness of the address allocation, if the detection results correspond to the respective associated expectation information, and
signaling an error, if at least one of the detection results does not correspond to the associated expectation information.

According to the disclosure it may be advantageous if the step of signaling an error comprises the indication of a concrete error based on the deviation of the detection result from the associated expectation information.

Suitably, providing the allocation information comprises the following step:
performing an address allocation process, under control by the bus master, for an automatic allocation of addresses to a bus node to be addressed provided with a current measuring circuit and a current source, which allocation is performed sequentially in a defined order starting from the bus node to be addressed connected to the data bus at the position farthest from the bus master to the bus node to be addressed connected to the data bus at the position closest to the bus master.

In a further advantageous example it is provided that, via its current source, each bus node to be addressed supplies current into the data bus upstream of the respective bus node with respect to the bus master via its current source or upstream of its current measuring circuit with respect to the bus master or in that, via their respective current sources, some of the bus nodes to be addressed supply current into the data bus upstream of the respective bus node with respect to the bus master or upstream of the respective current measuring circuit with respect to the bus master, whereas, via their respective current sources, the rest of the bus nodes to be addressed supply current into the data bus downstream of the current measuring circuit with respect to the bus master. According to this example it is thus provided that each bus node to be addressed supplies current into the data bus via its current source, specifically at a location between its current measuring circuit and the next neighbor in the direction of the bus master or, if the respective bus node is the next neighbor to the bus master, at a location between its current measuring circuit and the bus master. As an alternative it may be provided that some of the bus nodes to be addressed supply current into the data bus via their respective current sources, specifically at a location between the current measuring circuit of the respective bus node and the next neighbor in the direction of the bus muster or, if the respective bus node is the next neighbor in the direction of the bus master, at a location between the current measuring circuit of the respective bus node and the bus master. The remaining bus nodes to be addressed supply current into the data bus via their respective current source at a location between their current measuring circuit and the next neighbor in the direction opposite to the bus master or, if such a remaining bus node to be addressed is the bus node connected to the data bus at a location most remote from the bus master, the respective bus node supplies current into the data bus via its current source at a location behind its current measuring circuit, seen from the bus master.

It is also possible that at least one bus node provided with a current measuring circuit and a current source is connected to the data bus, to which an address has been allocated by the manufacturer.

It is further possible that at least one bus node without a current measuring circuit and without a current source is connected to the data bus, to which an address has been allocated by the manufacturer.

According to the disclosure a bus node of a data bus system provided with an address allocated by the bus master of the serial data bus system comprises:
a control unit for accepting an address allocated to the bus node,
a current measuring circuit allocated to the bus node, for measuring a current in the data bus, and
a current source,
wherein, upon reception of an instruction from the bus master directed to the bus node, the control unit controls the current source to supply a current into the data bus and transmits information to the bus master as to whether the current measuring circuit allocated to the bus node detects a current flow in the data bus or not.

A method for operating a bus node, e.g. a bus node of the above-mentioned type, comprises the following steps:
allocating an address to the bus node,
causing, by a bus master for the verification of the correctness of the bus node address, the bus node to supply a current into a data bus,
verifying, by the bus node, whether a current measuring circuit allocated to the bus node and connected to the data bus measures a current flow or not, and
reporting the result of the verification to the bus master by the bus node.

The manner in which the automatic allocation of addresses to the addressable bus nodes is affected in the serial data bus system is basically of secondary importance to the disclosure. Several documents or pending patent applications were already mentioned above, the contents of which can be used in combination with the disclosure. Further auto addressing methods whose correct execution can be verified reliably with the help of the disclosure, are described in EP 3 461 068 A1, EP 3 493 479 A1, EP 3 461 069 A1, EP 3 493 481 A1 and EP 3 496 341 A1, as well as in US2019/0095379 B2, US2019/0166089 B2 and US2019/0173838 B2 and in CN109618013 A, CN109862128 A and in CN109871345 A, the contents of which become a part of the subject matter of the present application by reference.

In an alternative example of the disclosure the same thus relates to a method for detecting an erroneous bus node address allocation in e.g. linear data bus systems with auto addressing using an addressing current, such as LIN data bus systems with auto addressing. The method comprises the steps of performing the auto addressing of the n bus nodes, causing an addressing current to be supplied by a bus node—the supply bus node—, wherein the supply is or can be caused by the bus master, sensing the data bus current by the bus nodes and determining a bus node-specific bus current measurement value, deciding, whether an addressing current flows through the respective bus node, and determining a bus node-specific addressing current presence value, wherein the decision can be made in the bus node and/or in the bus master, transmitting the bus node-specific bus current measurement value and/or the bus node-specific addressing current presence value from the bus node to the bus master, forming a supply bus node-specific result vector from the received bus node-specific addressing current presence values, and comparing the supply bus node-specific result vector and a supply bus node-specific expectation vector.

In a data bus system with auto addressing using an addressing current of the type described above, the object is achieved, according to the disclosure, by the bus master causing a bus node—the supply bus node—to supply an addressing current, the bus nodes then sensing the respective bus current at their respective bus node position and determining a bus node-specific bus current measurement value. Then, a decision is made on whether an addressing current flows through the respective bus node and the presence of a bus node-specific addressing current is determined, wherein the decision can be made in the bus node and/or in the bus master. The method also comprises the transmission of the bus node-specific bus current measurement value and/or the bus node-specific addressing current presence value to the bus master. The bus node-specific addressing current presence value can also be determined only in the bus master. The method further comprises forming a supply bus node-specific result vector from the received bus node-specific addressing current presence values and comparing a supply bus node-specific result vector and a supply bus node-specific expectation vector. The specific further treatment of the comparison results is the subject matter of the developments of this method.

Accordingly, a method for verifying the correct position for auto-addressed bus nodes is proposed which is provided and suited for the detection of an erroneous allocation of an address even after the modules have been installed and addressed. Such an erroneous allocation of an address may also be caused with the same effect by the failure of the addressing logic in a bus node.

Therefore, it is another advantage of the method presented herein that it can be executed during operation or non-operation of a vehicle, even after delivery of the vehicle.

After execution of an auto addressing process based on an addressing current, in particular after one or a plurality of the above mentioned steps, an independent verification sequence is carried out subsequently, as proposed, from which the position of the bus nodes in the data bus system can be determined clearly.

The bus master sequentially requires preferably each bus node to supply its addressing current into the data bus towards the bus master. The bus master carries out one verification cycle per bus node, in which one bus node at a time supplies its addressing current for verification purposes. The bus master requires each bus node to measure the bus current at its respective bus node position and to determine a bus current value. The bus nodes transmit their respective bus current measuring value to the bus master such that the bus master can allocate a bus node address to each of the transmitted bus current measuring values.

|  | Bus node ID4 | Bus node ID3 | Bus node ID2 | Bus node ID1 |
|---|---|---|---|---|
| cycle 1 | Measure current, result: current detected | Measure current, result: current detected | Measure current, result: current detected | Switch on current and measure Result A: NO current detected, Result B: current detected |
| cycle 2 | Measure current, result: current detected | Measure current, result: current detected | Switch on current and measure Result A: NO current detected, Result B: current detected | Measure current, result: NO current detected |
| cycle 3 | Measure current, result: current detected | Switch on current and measure Result A: NO current detected, Result B: current detected | Measure current, result: NO current detected | Measure current, result: NO current detected |
| cycle 4 | Switch on current and measure Result A: NO current detected, Result B: current detected | Measure current, result: NO current detected | Measure current, result: NO current detected | Measure current, result: NO current detected |

Important note for a better understanding of the above table:
  Result A: If a methodology for auto addressing is used in which the addressing current of a bus node does not flow through the allocated bus shunt resistor, the result must be that the bus node does not measure its own addressing current [e.g. EP 1 490 772 B1]
  Result B: If a methodology for auto addressing is used in which the addressing current of a bus node does flow through the allocated bus shunt resistor, the result must be that the bus node measures its own addressing current [e.g. DE 10 2017 122 365 B3]
Example for 4 bus nodes on a data bus with correct addressing.

Since the correct order of the bus nodes is most often known from design, this constructively specifiable information can be provided to the bus master during production time, which is typically done by programming.

The bus master can then perform the four step verification below or may cause the verification to be carried out by itself or another unit:

Firstly, the bus master can determine, whether exclusively those bus nodes that are arranged between the supplying bus node and itself, measure an addressing current, as expected.

Secondly, the bus master can determine, whether all bus nodes to be addressable bus nodes addressed that are arranged between the supplying bus node and itself, measure an addressing current, as expected.

Thirdly, the bus master can determine, whether exclusively those bus nodes that are NOT arranged between the supplying bus node and itself, measure NO addressing current, as expected.

Fourthly, the bus master can determine, whether all those bus nodes that are NOT arranged between the supplying bus node and itself, measure NO addressing current, as expected.

If one of those questions does not correspond to the expectation value, an error exists. The bus master can signal this error to a higher-level system internal to the vehicle or to an external system, e.g. a test system or a vehicle user, depending on the use and the safety requirements and the usage situation.

However, during production and/or maintenance it is useful to be able to determine exactly which of the bus nodes shows an error. Moreover, a full error coverage is generally required.

For this purpose, the bus master repeats the verification cycle for each of the bus nodes. The bus master thus advantageously determines a response vector for each of the bus nodes. In a bus system with n bus nodes, the response vector has n dimensions. Thus, the bus master determines a n×n response matrix, wherein an entry in a response matrix is 1 or 0. The diagonal relates to the supplying bus nodes themselves and is set as 1 or 0, depending on the programmer's view. Here 1 can mean for example that an addressing current was measured during verification. Then, 0 necessarily means that no addressing current was measured. Given a correct allocation, an exemplary matrix for a system with four bus nodes looks as follows:

|   | a | b | c | d |
|---|---|---|---|---|
| A | 0 | 1 | 1 | 1 |
| B | 0 | 0 | 1 | 1 |
| C | 0 | 0 | 0 | 1 |
| D | 0 | 0 | 0 | 0 |

The bus nodes are identified by the letters a, b, c, d for exemplary purposes, beginning with the bus node connected to the data bus at the position farthest from the bus master, whereas A, B, C, D identify the individual measuring or verification cycles.

In measuring cycle A, bus node a supplied an addressing current. Since the bus node a is situated farthest from the bus master, bus nodes b, c, d determine an addressing current. Therefore, the corresponding values of the matrix are set to 1.

In measuring cycle B, bus node b supplied an addressing current. Since bus node a succeeds bus node b, seen from the bus master, it determined no addressing current in the data bus. Therefore, its value is set to 0. Since bus nodes c and d precede bus node b, seen from the bus master, each determined an addressing current in the data bus. Therefore, their values are set to 1.

In measuring cycle C, bus node c supplied an addressing current. Since bus nodes a and b succeed bus node c, seen from the bus master, they determined no addressing current in the data bus. Therefore, their values are set to 0. Since bus node d precedes bus node c, seen from the bus master, it determined an addressing current in the data bus. Therefore, its value is set to 1.

In measuring cycle D, bus node d supplied an addressing current. Since bus nodes a, b and c succeed bus node d, seen from the bus master, they determined no addressing current in the data bus. Therefore, their values are set to 0.

The matrix is deformed in a characteristic manner if certain errors exist.

Some exemplary cases are mentioned below:

Failure of addressing current source of bus node b at the time of testing (addressing possibly correct):

|   | a | b | c | d |
|---|---|---|---|---|
| A | 0 | 1 | 1 | 1 |
| B | 0 | 0 | 0 | 0 |
| C | 0 | 0 | 0 | 1 |
| D | 0 | 0 | 0 | 0 |

Failure of addressing current source of bus node b at the time of testing and at the time of addressing:

|   | A | b | c | d |
|---|---|---|---|---|
| A | 0 | 1 | 1 | 0 |
| B | 0 | 0 | 0 | 0 |
| C | 0 | 0 | 0 | 0 |
| D | 0 | 0 | 0 | 0 |

Since, due to the absence of addressing current of bus node b, bus node c assumed to be the last node, both bus node c and bus node b have accepted the same bus node address, because, during the addressing process, they simultaneously assumed to be the last bus node. The bus node address for bus node d was thus not accepted by any bus node.

After the results of all cycles are available to the bus master (current detected/no current detected), it can be evaluated clearly, whether the bus nodes were correctly addressed one after the other along the data bus.

Thus, a method is proposed for detecting an erroneous bus node address allocation in data bus systems with auto addressing using an addressing current. Here, the data bus system comprises a data bus, a bus master and n bus nodes. Each bus node is incorporated in the data bus and, therefore, an electric current supplied by a subsequent bus node flows through each bus node towards the bus master. For this reason, the method is not applicable to a star configuration. Accordingly, the bus master is situated at one end of the data bus. The bus node which, along the data bus, is closer to the bus master in the sequence of bus nodes, seen from the bus master, than another bus node is hereinafter referred to as the preceding bus node and the other bus node is referred to as the succeeding bus node. Each bus node can supply an addressing current into the data bus which flows towards the bus master. Thus, in case of such supply by succeeding bus nodes, the addressing current of succeeding bus nodes flows through each bus node. Preferably each of the bus nodes comprises a measuring device provided for sensing the addressing current of succeeding bus nodes. The method proposed comprises the following steps:

performing the auto addressing of the n bus nodes;

initiating the supply of an addressing current by a bus node—the supply bus node-, wherein the initiation is affected by the bus master;

sensing the data bus current by the bus nodes and determining a bus node-specific bus current measuring value;

deciding, whether an addressing current flows through the respective bus node and determining a bus node-specific addressing current presence value, wherein the decision can be made in the bus node and/or in the bus master;

transmitting the bus node-specific bus current measuring value and/or the bus node-specific addressing current presence value from the bus node to the bus master;

forming a supply bus node-specific result vector from the received bus node-specific addressing current presence values;

comparing a supply bus node-specific result vector and a supply bus node-specific expectation vector.

Preferably, the above described method steps are performed for all bus nodes as supply bus nodes. Of course, the step of performing the auto addressing of the n bus nodes is not performed again for all other bus nodes as supply bus nodes.

Thereafter, the determined supply bus node-specific result vectors are compared to supply bus node-specific expectation vectors for a correct allocation, and a correct allocation is deduced if the determined supply bus node-specific result vectors correspond to the supply bus node-specific expectation vectors for a correct allocation.

It is likewise preferred to then compare the determined supply bus node-specific result vectors to supply bus node-specific expectation vectors for a correct allocation and to deduce an INCORRECT allocation if the determined supply bus node-specific result vectors do NOT correspond to the supply bus node-specific expectation vectors for a correct allocation.

Moreover, specific errors can be calculated in advance using the resulting patterns. This can be used to identify the type of error.

Therefore, it is further preferred to compare the determined supply bus node-specific result vectors to supply bus node-specific expectation vectors for an INCORRECT allocation and to deduce a predetermined concrete error if the determined supply bus node-specific result vectors correspond to the supply bus node-specific expectation vectors for an INCORRECT allocation.

Depending on the error detected, an error-specific signaling to a user, a test device and/or a higher-level system can be made.

ADVANTAGES OF THE DISCLOSURE

Such a method for detecting an erroneous bus node address allocation in data bus systems with auto addressing using an addressing current allows, at least in some implementations, for:
- an increased trustworthiness in auto addressing by a division into two separate mechanisms for addressing and for verification for the correctness of an allocation.
- a detection of incorrect address allocations.
- an increase in test coverage and a simplification of the production end test at the vehicle manufacturer.
- the possibility of mechanisms of functional safety. In particular, a so-called "Safety Measure", i.e. a safety measuring value for a successful auto addressing becomes possible by the proposed method.
- the performance of the test when a vehicle is at rest or in operation.

However, the advantages are not restricted to the above.

Examples comprise one or a plurality of the following feature groups and/or one or a plurality of features of one or a plurality of the following feature groups:

1) Method for detecting an erroneous bus node address allocation in data bus systems with auto addressing using an addressing current,
   wherein the data bus system comprises a data bus, a bus master and n bus nodes, and
   wherein each bus node is incorporated in the data bus, and
   wherein the bus master is located at one end of the data bus, and
   wherein a bus node which is closer in the sequence of bus nodes along the data bus than another bus node, seen from the bus master, is hereinafter referred to as a preceding bus node and the other bus node is referred to as a succeeding bus node, and
   wherein each bus node can supply an addressing current into the data bus towards the bus master, and
   wherein, in case of such a supply by succeeding bus nodes, the addressing current of succeeding bus nodes flows through each bus node, and
   wherein each of the bus nodes can sense such an addressing current flowing therethrough,
   comprising the steps of
     performing the auto addressing of the n bus nodes;
     initiating the supply of an addressing current by a bus node—the supply bus node-, wherein the initiation is affected by the bus master;
     sensing the data bus current by the bus nodes and determining a bus node-specific bus current measuring value;
     deciding, whether an addressing current flows through the respective bus node and determining a bus node-specific addressing current presence value, wherein the decision can be made in the bus node and/or in the bus master;
     transmitting the bus node-specific bus current measuring value and/or the bus node-specific addressing current presence value from the bus node to the bus master;
     forming a supply bus node-specific result vector from the received bus node-specific addressing current presence values;
     comparing a supply bus node-specific result vector and a supply bus node-specific expectation vector.

2) Method comprising the following step:
   performing the preceding steps except for the step "performing the auto addressing of the n bus nodes" for all other bus nodes as supply bus nodes.

3) Method comprising the following steps:
   comparing the determined supply bus node-specific result vectors to supply bus node-specific expectation vectors for a correct allocation, and
   deducing a correct allocation if the determined supply bus node-specific result vectors correspond to the supply bus node-specific expectation vectors for a correct allocation.

4) Method comprising the following steps:
   comparing the determined supply bus node-specific result vectors to supply bus node-specific expectation vectors for a correct allocation, and
   deducing an INCORRECT allocation if the determined supply bus node-specific result vectors do NOT correspond to the supply bus node-specific expectation vectors for a correct allocation.

5) Method comprising the following steps:
   comparing the determined supply bus node-specific result vectors to supply bus node-specific expectation vectors for an INCORRECT allocation, and
   deducing a specific error if the determined supply bus node-specific result vectors correspond to the supply bus node-specific expectation vectors for an INCORRECT allocation, wherein the method is performed when a vehicle is at rest, and
wherein the method is performed during operation of a vehicle.

6) Device configured and/or provided to perform one or more of the preceding method steps.

LIST OF CITED DOCUMENTS

EP 1 490 772 B1
EP 1 603 282 B1
EP 1 676 403 B1
DE 10 2017 122 365 B3
DE 10 2010 026 431 B4
DE 10 2017 128 489 A1
DE 10 2017 128 923 A1
DE 10 2017 012 179 A1
DE 10 2018 104 488 A1
DE 10 2018 104 489 A1
DE 10 2018 124 279 A1
DE 10 2018 124 281 A1
EP 3 461 068 A1
EP 3 493 479 A1
EP 3 461 069 A1
EP 3 493 481 A1
EP 3 496 341 A1
US 2019/0095379 B2
US 2019/0166089 B2
US 2019/0173838 B2
CN 109 618 013 A
CN 109 862 128 A
CN 109 871 345 A
WO 2019/233776 A1
Specification by Elmos Semiconductor AG "RGB LIN Controller with Current Source E521.36" (QM-Nr.: 25DS0160E.02)

The invention claimed is:

1. A method for verifying a correctness of previously allocated addresses to bus nodes of a serial data bus system comprising a data bus, a bus master and a plurality of bus nodes each having a respective address, wherein the data bus extends from the bus master and the bus nodes are connected to the data bus, and wherein at least some of the bus nodes comprise a respective current measuring circuit serially connected to the data bus and a respective current source for supplying a respective current into the data bus which current flows to the bus master,
the method comprising:
providing, for and/or in the bus master, allocation information regarding the allocation of the respective addresses of the bus nodes to their respective positions in the data bus and expectation information regarding the bus node or the bus nodes comprising the respective current measuring circuit, which is or are expected to detect the respective current if a respective one of these bus nodes supplies the current into the data bus via its respective current source, which current flows towards the bus master,
initiated by the bus master, causing the respective current to be supplied by one of the bus nodes comprising the respective current measuring circuit and the respective current source,
detecting by all the bus nodes comprising the respective current measuring circuit and the respective current source, whether the bus nodes respectively sense the current or not,
transmitting the detection results to the bus master by the bus nodes comprising the respective measuring circuits and the respective current sources, and
comparing, the detection results and a respective expectations information.

2. The method of claim 1, wherein the comparison of the detection results and the respective expectation information is performed by the bus master.

3. The method of claim 1, wherein the data bus is a linear data bus.

4. The method of claim 1, further comprising:
causing the supply of the current by the bus node into the data bus,
detecting whether each of the bus nodes sense the current or not, the detection being performed by all of the bus nodes comprising the respective current measuring circuit and the respective current source, and
transmitting the detection results by the bus nodes to the bus master for each bus node comprising the respective current measuring circuit and the respective current source, and
comparing, the detection results and the respective expectation information in order to assess whether the bus nodes are correctly addressed.

5. The method of claim 4 wherein the comparison of the detection results and the respective expectation information is performed by the bus master.

6. The method of claim 4, further comprising:
acknowledging the correctness of the address allocation, if the detection results correspond to the respective expectation information, and
signaling an error, if at least one of the detection results does not correspond to the respective expectation information.

7. The method of claim 6, wherein signaling an error comprises an indication of a concrete error based on a deviation of the at least one detection result from the respective expectation information.

8. The method of claim 1, wherein providing the allocation information comprises:
performing an address allocation process, under control of the bus master, for an automatic allocation of addresses to bus nodes to be addressed provided with the respective current measuring circuit and the respective current source, which allocation is performed sequentially in a defined order starting from a bus node to be addressed connected to the data bus at a position farthest from the bus master to a bus node to be addressed connected to the data bus at a position closest to the bus master.

9. The method of claim 8, wherein, via its current source, each bus node to be addressed supplies current into the data bus upstream of the respective bus node with respect to the bus master via its current source or upstream of its current measuring circuit with respect to the bus master or in that, via their respective current sources, some of the bus nodes to be addressed supply current into the data bus upstream of the respective bus node with respect to the bus master or upstream of the respective current measuring circuit with respect to the bus master, whereas, via their respective current sources, the rest of the bus nodes to be addressed supply current into the data bus downstream of the current measuring circuit with respect to the bus master.

10. The method of claim 1, wherein at least one bus node provided with the respective current measuring circuit and the respective current source is also connected to the data bus, to which bus node an address has been allocated by a manufacturer.

11. The method of claim 1, wherein at least one bus node without a current measuring means and without a current source is also connected to the data bus, to which bus node an address has been allocated by a manufacturer.

12. A bus node of the serial data bus system provided with an address allocated by the bus master of the serial data bus system, for implementation in the method of claim 1, comprising:
- a control unit for accepting the address allocated to the bus node,
- the respective current measuring circuit allocated to the bus node, for measuring a current in the data bus, and
- the respective current source,
- wherein, upon reception of an instruction from the bus master directed to the bus node, the control unit controls the current source to supply the current into the data bus and transmits information to the bus master as to whether the current measuring circuit allocated to the bus node detects a current flow in the data bus or not.

13. A method for operating the bus node of claim 12, comprising:
- allocating an address to the bus node,
- causing, by the bus master for the verification of the correctness of the bus node address, the bus node to supply the current into the data bus,
- verifying, by the bus node, whether the respective current measuring circuit allocated to the bus node and connected to the data bus measures the current flow or not, and
- reporting a result of the verification to the bus master by the bus node.

* * * * *